US007356304B2

(12) United States Patent
Zoeckler

(10) Patent No.: US 7,356,304 B2
(45) Date of Patent: Apr. 8, 2008

(54) SUBSCRIPTION EXPIRATION NOTIFICATION DATE

(75) Inventor: Dennis L. Zoeckler, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 594 days.

(21) Appl. No.: 10/716,860

(22) Filed: Nov. 19, 2003

(65) Prior Publication Data

US 2005/0107035 A1 May 19, 2005

(51) Int. Cl.
*H04H 1/00* (2006.01)
*H04B 7/08* (2006.01)

(52) U.S. Cl. .................. 455/3.01; 455/3.06; 455/3.04; 455/132

(58) Field of Classification Search ............... 455/3.01, 455/3.02, 3.04, 3.06, 3.05, 427, 132, 142
See application file for complete search history.

(56) References Cited

U.S. PATENT DOCUMENTS 5,963,859 A * 10/1999 Keating ...................... 455/405
6,563,805 B1 * 5/2003 Ma et al. .................... 370/325
6,904,264 B1 * 6/2005 Frantz ....................... 455/3.04
2002/0123336 A1 * 9/2002 Kamada ...................... 455/420
2003/0009765 A1 * 1/2003 Linden et al. ................ 725/95

FOREIGN PATENT DOCUMENTS

EP 1094667 * 4/2001

* cited by examiner

*Primary Examiner*—Tilahun Gesesse

(57) ABSTRACT

A system and method for providing subscription service notification at a mobile digital radio device is described. The method includes determining a digital radio subscription service expiration notice, communicating the subscription service expiration notice to a mobile digital radio receiver, storing a received expiration notice at the digital radio receiver, and providing the stored expiration notice to a user. A computer readable medium having computer readable code for determining a digital radio subscription service expiration notice is also provided. Computer readable code for directing the communication of the subscription service expiration notice to a mobile digital radio receiver, computer readable code for storing a received expiration notice at the digital radio receiver; and computer readable code for providing the stored expiration notice to a user are stored to the computer readable medium.

19 Claims, 4 Drawing Sheets

SUBSCRIPTION EXPIRATION NOTIFICATION DATE

FIELD OF THE INVENTION

The invention relates to subscription service features delivered over a wireless communication system. More specifically, the invention relates to a method and system for providing subscription service expiration notification at a mobile digital radio.

BACKGROUND OF THE INVENTION

Many consumers now own a satellite digital radio receiver. Satellite digital radio is a subscription service provided by a service provider to subscribers having a compatible satellite digital radio receiver. A satellite radio system generally includes a broadcasting facility that provides a variety of radio programming to a subscriber device through a pair of geostationary satellites. After the purchase of a satellite digital radio receiver for a vehicle, home or mobile use, a trial subscription period is usually offered so that a customer may assess the satellite radio service, and select a specific station and subscription services.

In order to initiate service to the radio, either for a subscription or trial period, an access code is broadcast to the radio that allows it to access certain subscription service features, such as select stations, for example. A unique cryptographic key is transmitted to the digital radio receiver unit, which enables the digital radio to access various subscription stations and broadcast content. At the expiration of a trial or subscription period, a signal is transmitted from a service center to the digital radio that stops the access privilege. A subscription service customer will typically have no warning prior to the digital radio subscription expiration other than the service agreement documentation or a billing statement. When the access privilege expires, the radio no longer has access to any subscription-level content. Furthermore, even a customer having an automatic billing option set-up to renew the subscription service will suffer an interruption of service until an authorization of payment is received and a new access code is generated and delivered to the radio via the satellite system.

It would therefore be desirable to provide a system and method for providing subscription service expiration notification at a mobile digital radio that overcomes these and other disadvantages.

SUMMARY OF THE INVENTION

The present invention is directed to a method for providing subscription service expiration notification at a mobile digital radio device. The method describes determining a digital radio subscription service expiration notice, communicating the subscription service expiration notice to a mobile digital radio receiver, storing a received expiration notice at the digital radio receiver, and providing the stored expiration notice to a user.

In accordance with another aspect of the invention, a system for providing subscription service expiration notification at a mobile digital radio device includes means for determining a digital radio subscription service expiration notice, means for communicating the subscription service expiration notice to a mobile digital radio receiver, means for storing a received expiration notice at the digital radio receiver, and means for providing the stored expiration notice to a user.

In accordance with yet another aspect of the invention, a computer readable medium is provided having computer readable code for determining a digital radio subscription service expiration notice, computer readable code for directing the communication of the subscription service expiration notice to a mobile digital radio receiver, computer readable code for storing a received expiration notice at the digital radio receiver; and computer readable code for providing the stored expiration notice to a user.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENT

Figure 1:
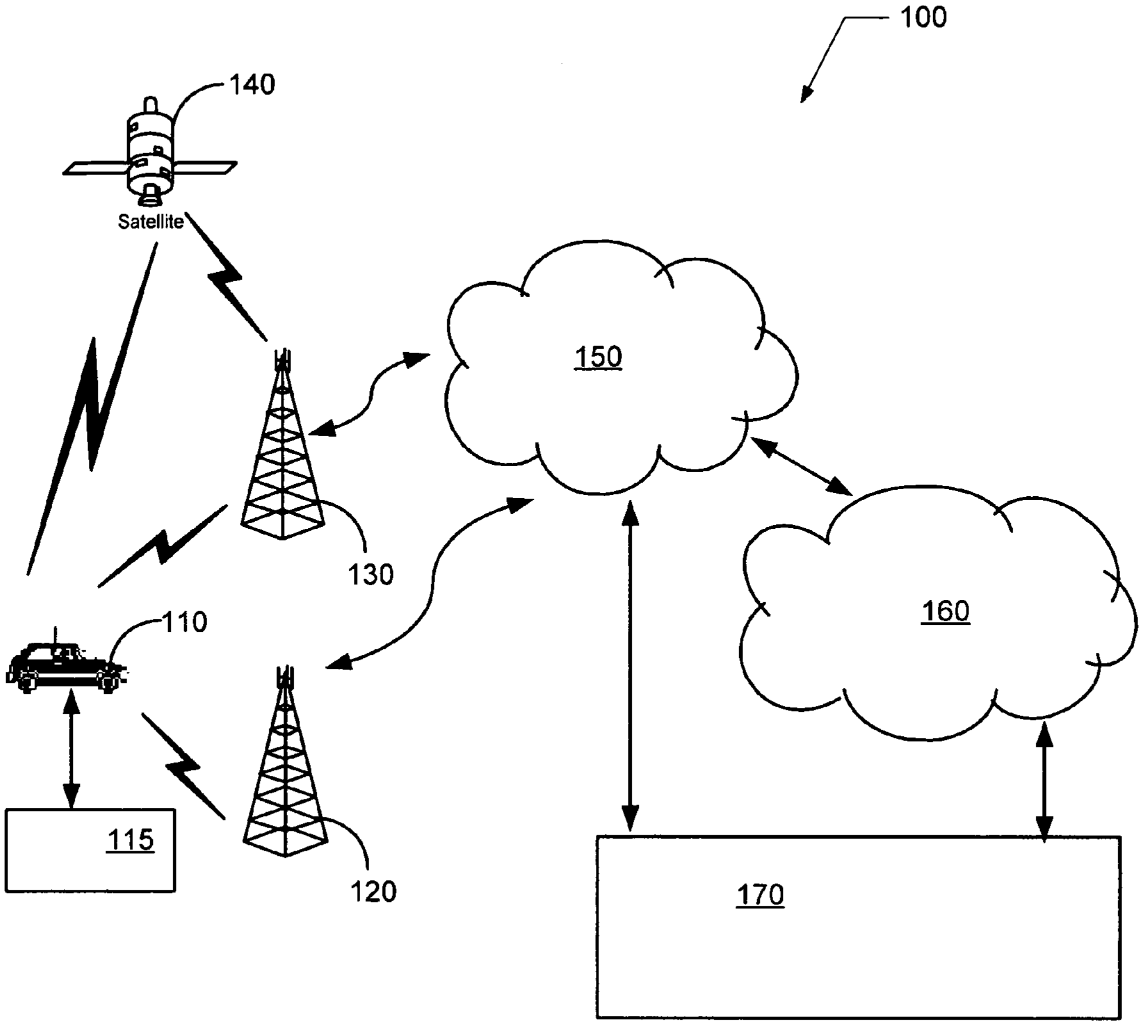
FIG. 1 is a block diagram of an exemplary operating environment according to an embodiment of the invention.

FIG. 1 is a block diagram of an exemplary operating environment according to an embodiment of the present invention. FIG. 1 shows an embodiment of a system for operating a satellite radio subscription service and a wireless communication service in a mobile vehicle, in accordance with the present invention, and is referred to as a mobile vehicle communication system (MVCS) 100. The mobile vehicle communication system 100 includes one or more mobile vehicle communication units (MVCU) 110, one or more digital radio receiver devices 115, one or more wireless communication systems 120, one or more radio carrier systems 130, one or more satellite broadcast systems 140, one or more communication networks 150, one or more land networks 160, and one or more service providers 170.

In one example, MVCS 100 is implemented as an OnStar® system, as is known in the art, and available from the OnStar division of General Motors Corporation based in Troy, Mich., with regards to wireless communications, and as an XM Satellite Radio® system, as is known in the art, and available from XM Satellite Radio, Inc., of Washington, D.C. with regards to satellite radio and terrestrial digital radio communications.

MVCU 110 includes a wireless vehicle communication device (module, MVCS module) such as an analog or digital phone with suitable hardware and software for transmitting and receiving data communications. In one embodiment, MVCU 110 further includes a wireless modem for transmitting and receiving data. In another embodiment, MVCU 110 includes a digital signal processor with software and additional hardware to enable communications with the mobile vehicle and to perform other routine and requested services. In another embodiment MVCU 110 includes a telematics unit.

In yet another embodiment, MVCU 110 includes a global positioning system (GPS) unit capable of determining synchronized time and a geophysical location of the mobile vehicle. In operation, MVCU 110 sends to and receives radio transmissions from, wireless communication system 120. MVCU 110 is also referred to as a mobile vehicle communication device throughout the discussion below.

Digital radio device 115 (radio device) includes hardware suitable for receiving digital radio broadcast signals. In one embodiment, radio device 115 includes a receiver that receives digital broadcasts from a broadcast system such as radio broadcast system 130, and satellite broadcast system 140. In another embodiment, radio device 115 is a mobile device suitable for operation with MVCS 110 or as stand-alone device. In this embodiment, radio device 115 is designed to be operated as a portable digital radio device that is removable from MCVS 110 and operational within a home, within another MVCS 110, or as a free-standing portable digital radio receiver. In one embodiment, radio device 115 is implemented as a digital radio receiver for receiving digital radio broadcasts from a terrestrial or satellite digital radio broadcasting system such as for example the XM Satellite Radio® system.

In another embodiment, radio device 115 further includes a medium for storing programming information. In an example, the programming information includes customer requested programs supplied by one or more providers including various radio station formats. Formatted programs include "Talk Radio," various music genres, targeted regional information, and the like. In another example, the customer requested programs are provided in the form of packages and referred to as a satellite radio program subscription (SRPS). In one embodiment, the storage medium is flash memory. In another embodiment, the storage medium is rewritable, such as, for example, a floppy disk or a hard drive. In yet another example, the storage medium is a removable storage medium such as, for example, a writable data compact disc.

In yet another embodiment, radio device 115 further includes an audio speaker, a synthesized voice output, an audio channel, and the like. In one example, radio device 115 includes headphones, a television receiver, and a display device.

In another embodiment, MVCU 110 includes an automatic speech recognition system (ASR) module capable of communicating with radio device 115. In yet another embodiment, the ASR module is capable of providing the function of part or all of the above communication devices. In still another embodiment, MVCU 110 is capable of data storage, data retrieval, and receiving, processing, and transmitting data queries. In one example, radio device 115 includes the ASR module.

Wireless communications system 120 is a wireless communications carrier such as a mobile cellular telephone system that transmits to and receives signals from one or more MVCU 110. Wireless communication system 120 incorporates any type of telecommunications in which electromagnetic waves carry signal over part of or the entire communication path. In one embodiment, wireless communication system 120 is implemented as any type of broadcast communication in addition to those of radio broadcast system 130 and satellite broadcast system 140. In another embodiment, wireless communications system 120 is implemented as a single unit in conjunction with radio broadcast system 130. In another embodiment, wireless communications system 120 is implemented via coupling with radio broadcast system 130, or in some such other configuration as would allow the systems to function as described.

In one example, such wireless communication system 120 is a short message service, modeled after established protocols such as IS-637 SMS standards, IS-136 air interface standards for SMS, and GSM 03.40 and 09.02 standards. Similar to paging, an SMS communication could be broadcast to a number of regional recipients. In another example, the system uses services compliant with other standards, such as, for example, 802.11 compliant systems and Bluetooth systems. In another embodiment, wireless communication system 120 operates using a Dedicated Short Range Communications standard (DSRC).

In another example, wireless communication system 120 is an analog mobile telephone system operating over a prescribed band nominally at 800 MHz. In yet another example, wireless communication system 120 is a digital mobile telephone system operating over a prescribed band nominally at 800 MHz, 900 MHz, 1900 MHz, or any suitable band capable of carrying mobile communications.

Radio broadcast system 130 transmits radio signals and data to radio device 115. In one embodiment, radio broadcast system 130 transmits analog audio and/or video signals. In an example, radio broadcast system 130 transmits analog audio and/or video signals such as those sent from AM and FM radio stations and transmitters, or digital audio signals in the S band (approved for use in the U.S.) and L band (used in Europe and Canada). In one embodiment, radio broadcast system 130 is a terrestrial digital radio broadcasting system, that is employed as a signal repeater for satellite broadcast system 140. In an example, radio device 115 retrieves terrestrial digital radio signals from a signal received from radio broadcast system 130. In another embodiment, radio device 115 stores or retrieves data and information from the audio and/or video signals of radio broadcast system 130.

Satellite broadcast system 140 transmits radio signals to radio device 115. In one embodiment, satellite broadcast system 140 broadcasts over a spectrum in the "S" band (2.3 GHz) that has been allocated by the U.S. Federal Communications Commission (FCC) for nationwide broadcasting of satellite-based Digital Audio Radio Service (DARS). In an example, satellite broadcast system 140 is implemented as XM Satellite Radio®.

In operation, broadcast services provided by radio broadcast system 130 and satellite broadcast system 140 are received by radio device 115. Broadcast services include various formatted programs based on a package subscription obtained by the user and managed by the radio device 115 and referred to above. In one embodiment, radio device 115 is configured to receive digital radio broadcasts from both a terrestrial digital radio broadcast system, such as radio broadcast system 130 and a satellite-based digital radio broadcast system, such as satellite broadcast system 140.

Communications network 150 is implemented as any suitable system or collection of systems for connecting wireless communications system 120 to at least one MVCU 110 or to a service provider 170. In one embodiment, communications network 150 includes a mobile switching center and provides services from one or more wireless communications companies.

Land network 160 connects communications network 150 to service provider 170. In one embodiment, land network 160 is implemented as a public-switched telephone network, a wired network, an optical network, a fiber network, another wireless network, or any combination thereof. In an example, land network 160 includes an Internet protocol (IP) network. In another embodiment, an MVCU 110 utilizes all or part of the wireless communications system 120, communications network 150, and land network 160.

In yet another embodiment, land network 160 connects one or more communications systems 120 to one another. In another embodiment, communication network 150 and land network 160 connect wireless communications system 120 to a communication node or service provider 170.

Service provider 170 is implemented as one or more locations where communications are received or originate to facilitate functioning of the mobile vehicle communication system (MVCS) 100. Service provider 170 may contain any of the previously described functions.

In one embodiment, service provider 170 is implemented as a call center, as known in the art. In an example, the call center is implemented as a voice call center, providing verbal communications between an advisor in the call center and a subscriber in a mobile vehicle. In another example, the call center is implemented as a voice activated call center, providing verbal communications between an ASR unit and a subscriber in a mobile vehicle. In yet another example, the call center is implemented as a virtual call center, providing virtual communications between a virtual advisor and a user interface. In another embodiment, the call center contains any of the previously described functions.

In operation, a service provider 170 utilizes one or more portions of the aforementioned communications network to communicate subscriber requested programming to radio device 115. The subscriber requested programming is then accessed by radio device 115 utilizing one or more radio broadcast system 130 and satellite broadcast system 140 segments. In one embodiment, a subscriber receives subscription service expiration notification at radio device 115.

Figure 2:
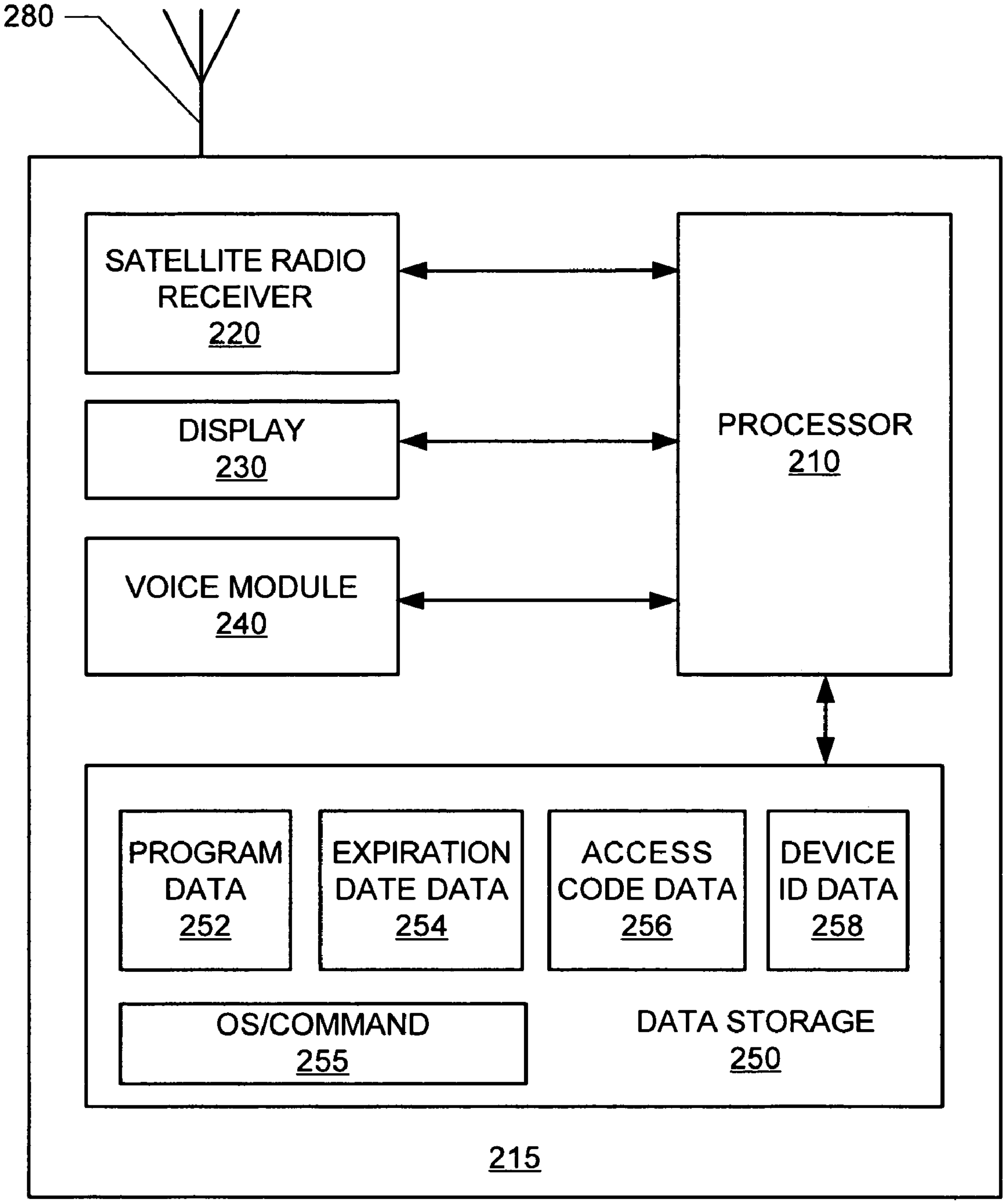
FIG. 2 is a block diagram of a digital radio device to which the method of the invention may be applied.

FIG. 2 is a block diagram of a digital radio device to which the method of the invention may be applied. FIG. 2 shows a digital radio device 215 including a processor 210, a satellite radio receiver 220, a display 230, a voice module 240, and data storage 250. The data storage 250 is shown additionally comprising program data 252, expiration data 254, access code data 256, device ID data 258 and OS/Command program 255. In one embodiment, digital radio device 215 is a component of a mobile vehicle communication system (MVCS) 100. In another embodiment, digital radio device 215 is a mobile digital radio receiver implemented for use with an MVCS 100, a base-station for in-home use and as a portable stand-alone device.

Processor 210 is any processor, microcontroller or combination of processors and microcontrollers that executes computer instructions and programs. In one embodiment, processor 210 includes volatile or non-volatile memory for storing or caching data and computer code instructions. In operation, processor 210 executes an operating system commands to provide functions to digital radio device 215. In one embodiment, the processor is an embedded system having an integrated data storage and operating system.

Satellite radio receiver 220 is any radio receiver module configured to receive digital satellite broadcasts. In one embodiment, satellite radio receiver 220 is additionally configured to receive terrestrial digital and analog broadcasts. In operation, satellite radio receiver 220 receives digital satellite radio broadcasts from a satellite broadcasting system such as satellite broadcast system 140 of FIG. 1.

Display 230 is any visual display such as, but not limited to, a video display, an alpha-numeric liquid crystal (LCD), fluorescent (FD), or a light emitting diode (LED) display. In operation, display 230 provides alpha-numeric data to a user such as program selection information and song titles, for instance. In one embodiment, display 230 is configured to provide a Julian calendar date and/or a twenty-four-hour or twelve-hour time display. In this embodiment, the date provided is for the present day or another date, such as the expiration date of a digital radio subscription service. In another embodiment, the expiration date of a subscription service is displayed each time the radio device is powered on. In yet another embodiment, the display provides additional information such as telephone numbers, subscription auto renewal confirmation, greetings, reminder messages, and subscription status information. In operation, the display receives data and commands from the processor 210 and displays the data.

Voice module 240 is any hardware and software suitable for providing a synthesized voice interface. In one embodiment, voice module 240 includes a processor, memory having stored wave tables and programs, and a line level-audio interface. Another embodiment further includes an amplification circuit and a speaker suitable for synthesized speech reproduction. In operation, the voice module receives data and commands from the processor, and translates numeric and text data into synthesized human speech. In one embodiment, the voice module generates a synthesized day and date alert indicating the expiration of a digital radio subscription service.

Data storage 250 is any data storage device suitable for storing programs and data. In one embodiment, data storage 250 is integrated with processor 210 as an embedded system controller. In another embodiment, data storage is non-volatile solid-state storage, such as, for example, flash memory. In one embodiment, program data 252, such as user radio station choices are stored in data storage 250. In another embodiment, subscription service expiration date data 254 are stored in data storage 250. In yet another embodiment, unique cryptographic key access code data 256 is stored in data storage 250. The access code data 256 allows the digital radio device 215 to access various subscription channels (not shown). In still another embodiment, a unique radio identification code 258 is stored in data storage 250. Each radio receiver is assigned a unique identification tag during manufacture or initialization, as is known in the art. In yet another embodiment, operating system program commands 255 are stored in data storage 250. In an embodiment, other data (not shown) is stored to data storage 250. In operation, processor 210 accesses commands and data in data storage 250, and saves data to data storage 250.

Figure 3:
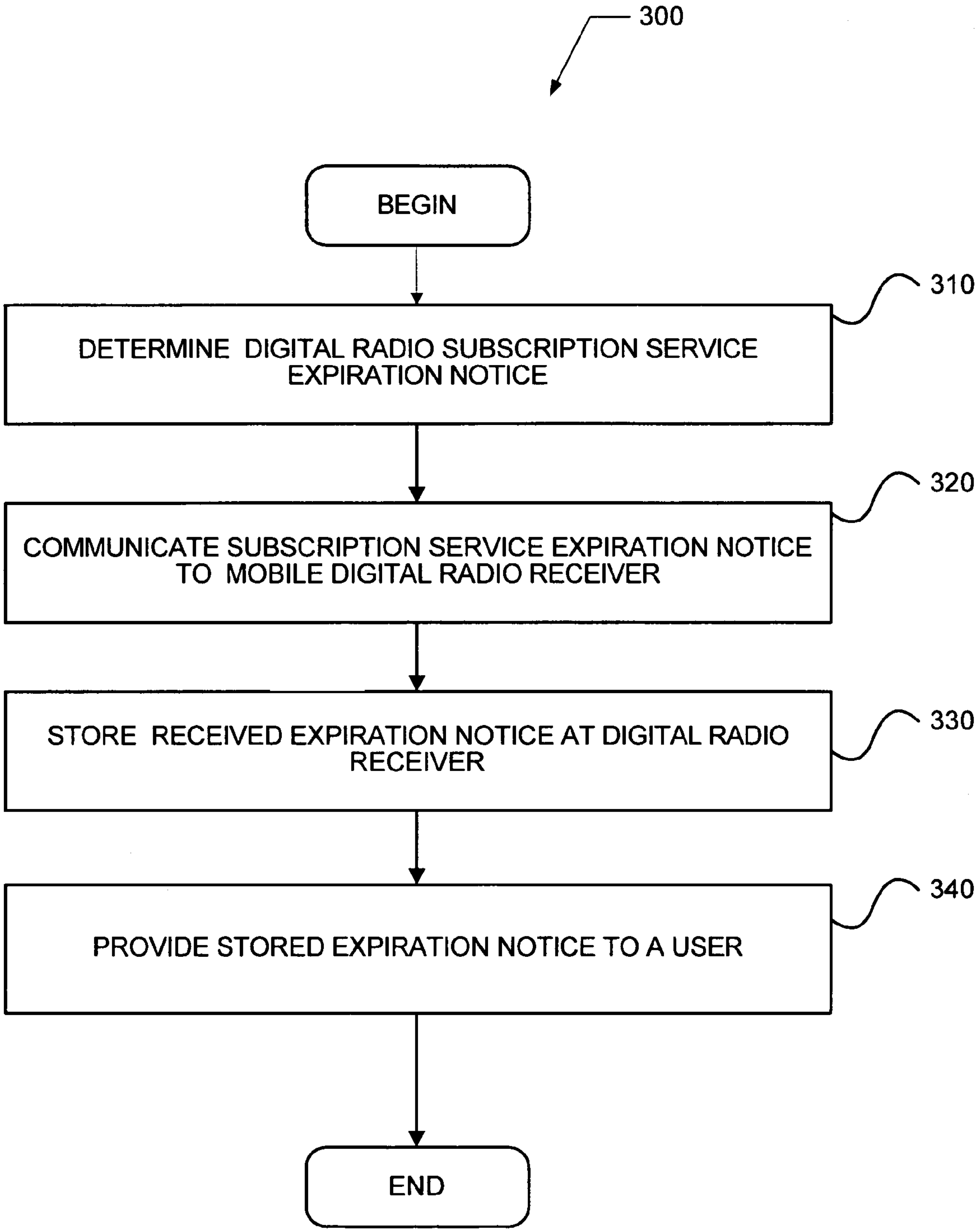
FIG. 3 is a flow diagram of a method for providing subscription service expiration notification at a mobile digital radio device according to an embodiment of the invention.

FIG. 3 is a flow diagram of a method for providing subscription service expiration notification at a digital radio device according to an embodiment of the invention. Method 300 begins at step 310. In an embodiment, a computer readable medium stores computer code for directing one or more steps of method 300.

In step 310, a digital radio subscription service expiration notice is determined. The expiration notice is determined at any time, continuously or at discrete intervals, after a digital radio device 215 is first enabled for reception. In one embodiment, determining an expiration notice comprises receiving subscription service enrollment data, associating the enrollment data with a unique radio identification code, and defining a digital radio subscription service expiration date based on the enrollment data and the unique radio identification code. The enrollment data is data such as, but not limited to, customer billing data, unique cryptographic code data, and subscription service data. In an example, a service provider 170 receives enrollment data from a customer seeking digital radio subscription services. The customer also provides the unique radio identification code for the digital radio device 215 that will be used with the subscription service so that the radio may be access radio channels within the selected subscription plan. Once a subscription service plan and term have been selected by the customer, a subscription service expiration date is defined for the account as the Julian calendar date that the paid for subscription will lapse. In one embodiment, the subscription service notification is the subscription service expiration date. If a customer renews a subscription prior to the expiration date, a new expiration date is defined.

In step 320, a subscription service expiration notification is communicated to a digital radio device 215. The expiration notification is communicated at any time after the notification is determined in step 310. In one embodiment, communicating the expiration notification comprises providing the subscription notice to a satellite broadcasting system 140, transmitting the subscription notice to the mobile digital radio device 215 via the satellite broadcasting system 140, and receiving the subscription notice at the digital radio device 215. In another embodiment, the subscription notice is provided to the broadcast system 140 responsive to a determination that a subscription service associated with a unique digital radio device 215 has been renewed. A further embodiment includes activating the digital radio device 215 responsive to receiving the expiration notice. A cryptographic key provided within the expiration notification allows the digital radio device 215 to access subscription services. Another embodiment includes deactivating the digital radio device 215 based on the expiration notice. In one embodiment, the expiration notification sets a trigger for the Julian calendar date of the subscription service expiration. When the expiration date trigger is tripped, the cryptographic access code is invalidated and access to the subscription channels is terminated.

In step 330, an expiration notice received at a digital radio device is stored. The expiration notice is stored at any time after it is received by the digital radio device 215. In an embodiment, storing the received expiration notice at the digital radio device 215 comprises determining if updated expiration notice data has been received, and storing the updated expiration notice data responsive to a determination that the expiration notice data is updated. If a customer renews a digital radio subscription, the expiration date of the subscription service changes. In operation, a notification date is not stored again after the first storage unless there is an update in the expiration notice data. In an example, if a customer has selected an automated renewal system, a credit card is billed at the expiration of the subscription service, and the received subscription service notification includes an alert that the subscription has been automatically renewed. In another embodiment, a new expiration date is provided to a user on a display or through a voice module 240 if a notification contains a different date than one currently stored in the digital radio device's data storage 250. In yet another embodiment, additional data contained in the notification is provided to a user through a display or a voice module 240.

In step 340, the stored expiration notice is provided to a user. The stored expiration notice is provided at any time after it has been stored, continuously or at discrete time intervals. In one embodiment, the notification is provided each time the digital radio device is powered on. In another embodiment, the notification is provided each time a date different from the stored subscription service expiration date is received. In yet another embodiment, providing the expiration notice to a user comprises providing a subscription service expiration date to a display device. In still another embodiment, providing the expiration notice to a user comprises providing a subscription service expiration date to a voice synthesis device. In a further embodiment, a customer selects preferences for when and how an expiration notice is to be provided.

Figure 4:
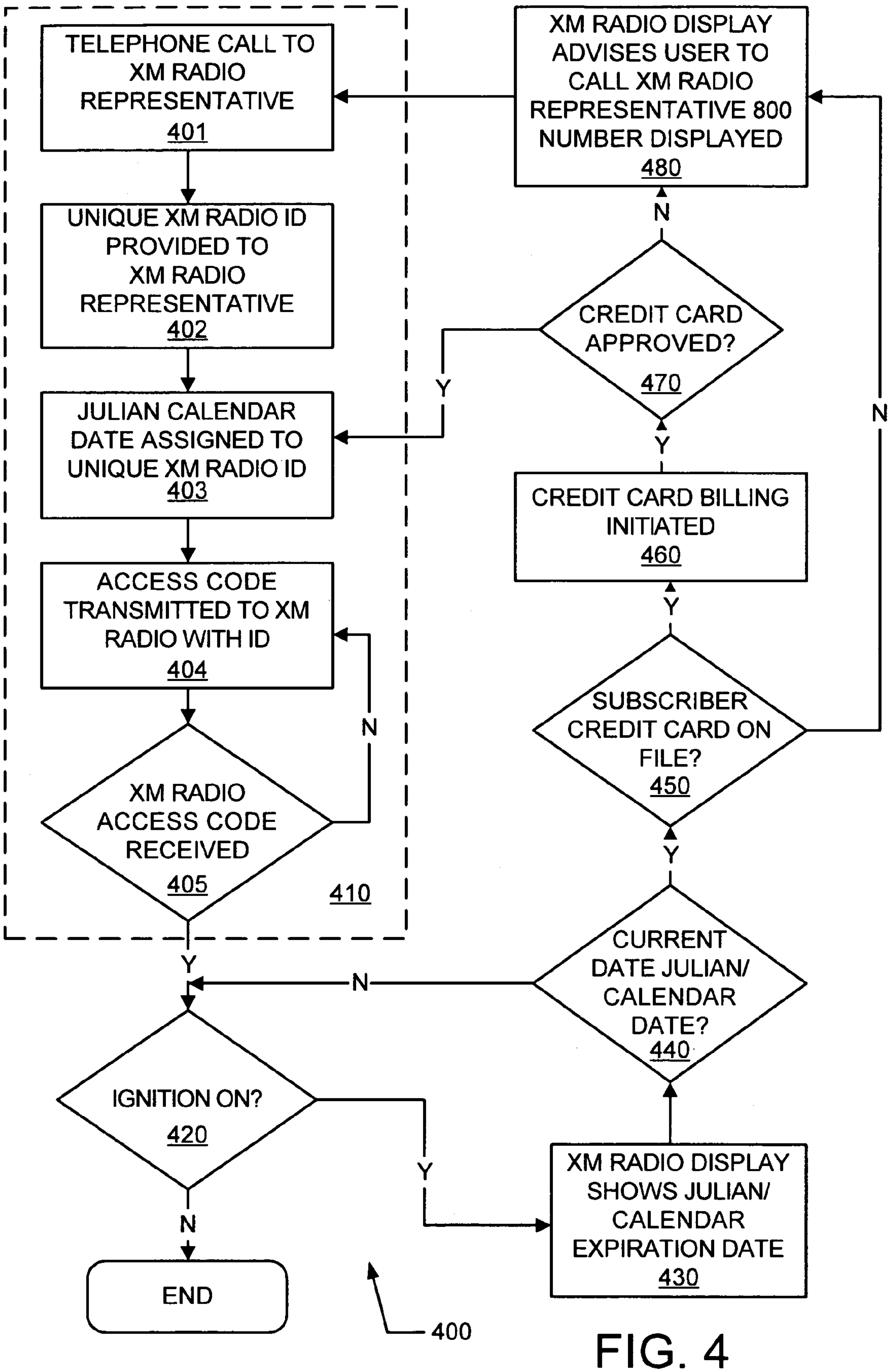
FIG. 4 is a flow diagram of a method for providing subscription service expiration notification at a digital radio device according to another embodiment of the invention.

FIG. 4 is a flow diagram of a method for providing subscription service expiration notification at a digital radio device according to another embodiment of the invention. Method 400 begins with step 401. In one embodiment, a digital radio subscription service activation is represented by steps 401 though 405.

In step 401, a service center receives a call from a customer. In one embodiment, the service center is a call center for XM satellite radio®, as is known in the art. A digital radio service representative in the service center receives a customer call and provides enrollment services such as subscription station selection and billing services to activate a digital radio subscription service for the digital radio customer. In another embodiment, a user accesses a website hosted by a satellite subscription service provider for enrollment services. In one embodiment, a credit card is used to pay for a subscription service.

In step 402, a unique digital radio device identifier is received to the service center to register the radio device with a digital radio satellite system server computer. Generally, a user provides the radio ID to the service center and the radio is registered for use with the subscription digital radio service.

In step 403, a Julian calendar date is assigned to the unique radio identifier associated with the subscription service. The Julian calendar date represents the expiration date of a digital radio subscription.

In step 404, an access code is transmitted through the digital satellite radio system to the digital radio having the unique radio identifier associated with the subscription service. In one embodiment, the access code is a cryptographic key that enables the digital radio device to receive satellite radio broadcasts. The subscription service that a customer selects governs which broadcast content the cryptographic key will allow access to from the digital radio satellite broadcast. In one embodiment, the access code includes the Julian calendar expiration date of the digital radio subscription service which is stored to the digital radio device when received. In another embodiment, the access code includes data identifying a subscription as having an auto-renewal option where the credit card data of the customer is on file with the service provider.

In step 405, a determination is made whether the access code has been received. When the determination is negative, method 400 returns to step 404 and the digital radio device waits for an access code to be broadcast from the satellite system. When the determination is affirmative, method 400 continues to step 420.

In step 420, a determination is made whether the ignition of a vehicle is activated, such as for example, when a driver has turned the ignition to the operate position. When the determination is negative method 400 terminates. When the determination is affirmative, method 400 continues to step 430.

In step 430, a digital radio displays the Julian calendar date of the digital radio subscription service associated with the digital radio.

In step 440, a determination is made whether the current date is the Julian calendar date that the subscription service expires. In one embodiment, when the determination is negative, the method returns to step 420. In another embodiment (not shown), when the determination is negative method 400 terminates, and other data is displayed on the radio display, such as, for example, radio channel data, song title data and the like. When the determination is affirmative, method 400 continues to step 450. In one embodiment, the digital radio subscription service is terminated at the expiration of the Julian calendar date. In one embodiment, the subscription service is terminated at the digital radio by a date trigger. In another embodiment, the subscription service is terminated through a satellite broadcast to the vehicle that revokes the access code.

In step 450, a determination is made whether subscriber credit card information is on file with a service provider. In one embodiment, the determination is made at a service center. In another embodiment, the determination is made at the digital radio device. When the determination is negative the method proceeds to step 480. When the determination is affirmative, method 400 continues to step 460. In one embodiment, automated renewal for a vehicle-based digital satellite radio is facilitated from a vehicle by a vehicle-based telematics service.

In step 460, a credit card billing authorization is initiated to renew the digital radio subscription service associated with the customer credit card billing data.

In step 470, a determination is made whether the credit card authorization is approved. When the determination is affirmative, method 400 proceeds to step 403, and a new Julian calendar expiration date is assigned to the customers XM digital radio. When the determination is negative, the method proceeds to step 480.

In step 480, the XM radio displays an instruction to contact an XM radio service center to renew subscription service. In one embodiment, the XM radio displays a toll-free telephone number of the XM radio service center.

The present invention may be embodied in other specific forms without departing from its spirit or essential characteristics. The described embodiments are to be considered in all respects only as illustrative and not restrictive.

We claim:

1. A method for providing subscription service expiration notification at a mobile digital radio device comprising:
- receiving a digital radio subscription service expiration notice containing a subscription service expiration date at a mobile digital radio receiver;
- storing the received expiration notice at the digital radio receiver; and
- providing the subscription service expiration date to a user, wherein providing the subscription service expiration date to a user comprises providing the subscription service expiration date to an interface device selected from the group consisting of a display device and a voice synthesis device.

2. The method of claim 1 further comprising:
- activating the digital radio receiver responsive to receiving the expiration notice.

3. The method of claim 2 further comprising:
- deactivating the digital radio receiver based on the expiration notice.

4. The method of claim 1 further comprising determining a digital radio subscription notice by performing steps including:
- receiving subscription service enrollment data;
- associating the enrollment data with a unique radio identification code; and
- defining a digital radio subscription service expiration date based on the enrollment data and the unique radio identification code.

5. The method of claim 4 wherein the enrollment data is selected from the group consisting of:
- customer billing data, unique cryptographic code data, and subscription service data.

6. The method of claim 1 further comprising communicating a subscription service expiration notice to a mobile digital radio receiver by performing steps including:
- providing the subscription notice to a satellite broadcasting system; and
- transmitting the subscription notice to the mobile digital radio receiver via the satellite broadcasting system.

7. The method of claim 6 wherein the subscription notice is provided to the broadcast system responsive to a determination that a subscription service associated with a unique digital radio receiver has been renewed.

8. The method of claim 2 wherein storing the received expiration notice at the digital radio receiver comprises:
- determining if updated expiration notice data has been received; and
- storing the updated expiration notice data responsive to a determination that the expiration notice data is updated.

9. A system for providing subscription service expiration notification at a mobile digital radio device comprising:
- means for receiving a subscription service expiration notice containing a subscription service expiration date at a mobile digital radio receiver;
- means for storing the received expiration notice at the digital radio receiver; and
- means for providing the subscription service expiration date to a user via a user interface device selected from the group consisting of a display device and a voice synthesis device.

10. The system of claim 9 further comprising:
- means for activating the digital radio receiver responsive to receiving the expiration notice.

11. The system of claim 9 further comprising:
- means for deactivating the digital radio receiver based on the expiration notice.

12. A computer-readable medium having thereon computer-executable code for implementing a method for providing subscription service expiration notification at a mobile digital radio device comprising instructions for:
- receiving a digital radio subscription service expiration notice containing a subscription service expiration date at a mobile digital radio receiver;
- storing the received expiration notice at the digital radio receiver; and
- providing the subscription service expiration date to a user, wherein providing the expiration notice to a user comprises providing the subscription service expiration notice to an interface device selected from the group consisting of a display device and a voice synthesis device.

13. The computer-readable medium of claim 12 further comprising instructions for:
- activating the digital radio receiver responsive to receiving the expiration notice.

14. The computer-readable medium of claim 13 wherein the instructions for storing the received expiration notice at the digital radio receiver further comprise instructions for:
- determining if updated expiration notice data has been received; and
- storing the updated expiration notice data responsive to a determination that the expiration notice data is updated.

15. The computer-readable medium of claim 13 further comprising instructions for:

deactivating the digital radio receiver based on the expiration notice.

16. The computer-readable medium of claim 12 further comprising instructions for determining a digital radio subscription notice by performing steps including:

receiving subscription service enrollment data;

associating the enrollment data with a unique radio identification code; and defining a digital radio subscription service expiration date based on the enrollment data and the unique radio identification code.

17. The computer-readable medium of claim 16 wherein the enrollment data is selected from the group consisting of:

customer billing data, unique cryptographic code data, and subscription service data.

18. The computer-readable medium of claim 12 further comprising instructions for communicating a subscription service expiration notice to a mobile digital radio receiver by performing steps including:

providing the subscription notice to a satellite broadcasting system;

transmitting the subscription notice to the mobile digital radio receiver via the satellite broadcasting system; and receiving the subscription notice at the mobile digital radio receiver.

19. The computer-readable medium of claim 18 wherein the subscription notice is provided to the broadcast system responsive to a determination that a subscription service associated with a unique digital radio receiver has been renewed.

* * * * *